June 26, 1962 R. C. BENTON 3,040,603

INDEXING MECHANISM

Original Filed June 19, 1959 6 Sheets-Sheet 1

INVENTOR.
Robert C. Benton
BY John W. Gaines
HIS ATTORNEY

INVENTOR.
Robert C. Benton
BY John W. [signature]
HIS ATTORNEY

INVENTOR.
Robert C. Benton
BY John W. [signature]
HIS ATTORNEY

INVENTOR.
Robert C. Benton
BY John W. Gaines
HIS ATTORNEY

INVENTOR.
Robert C. Benton
BY John W. Gaines
HIS ATTORNEY

INVENTOR.
Robert C. Benton
BY John W. Gaines
HIS ATTORNEY

United States Patent Office 3,040,603
Patented June 26, 1962

3,040,603

INDEXING MECHANISM

Robert C. Benton, State College, Pa., assignor to Centre Circuits, Inc., Pine Grove Mills, Pa., a corporation of Pennsylvania Original application June 19, 1959, Ser. No. 821,568. Divided and this application Oct. 2, 1959, Ser. No. 847,037
16 Claims. (Cl. 77—32.2)

This application relates to indexing mechanism in general and especially mechanisms of this character for rapidly and accurately indexing work tools with respect to work to be subjected to treatment or other steps, e.g., drilling, routing, milling, piercing or blanking operations. It is particularly adapted to bring a drill press into exact position relative to unmarked drill hole points on workpieces, e.g., electrical printed circuit blanks for production drilling of the latter.

My parent application Serial No. 821,568, filed June 19, 1959, of which the present application is a division, is primarily addressed to my invention of the form of this apparatus which is solely data controlled for accomplishing the foregoing automatically, affording the requisite accuracy with time-savings where necessary. Briefly, with respect to the workpiece element and tool element, this invention involves relatively moving the elements through large increment positioning to an approximately indexed position, simultaneously moving a separate indexing part through small increment positioning to an accurately predetermined position to which the workpiece element is to be finally aligned, and, lastly, establishing interengagement between the indexed element and the indexing part so as to relatively move the former and cause it to exactly line up with the latter. The last step indicated follows practically instantaneously as soon as the large and small increment positioning steps are completed and consumed time is at a minimum in view of the fact that the actual positioning steps are taking place simultaneously. These positioning steps, of course, comprehend positioning along two perpendicular coordinate axes so as to bring about both a top-to-bottom adjustment and a left-to-right adjustment in their common plane concurrently.

In the subject matter to which the present application is addressed and which is not dependent solely upon data input, I provide a light sensing head element which is carried by the tool, so as to be moved automatically to a formed hole in a master workpiece element which is to be duplicated on a board blank by said tool. My apparatus includes a positioning control for relatively moving the aforesaid two elements through large increment positioning to an approximately centered position in terms of the formed hole, simultaneously introducing a beam of light through that hole so as to project a light spot at a random point generally within and sensed by the head element and, finally, relatively moving said elements through final increment positioning thereof to a satisfied position of the light spot in which the support and the head accurately center on one another. Photoelectric cells are provided in the sensing head element in complementary fashion to one another for this purpose whereby, when the output of any photocell is reduced and its complementary photocell is increased, an error voltage is created in the positioning control causing the photocells to follow up the light spot through follow-up mechanism to produce accurate centering. It is evident that when the head element carried by the tool is accurately related along both coordinates to a fixed drill hole point in the master, the tool operation can then be automatically performed on the blank board and thus duplicate the point positioning of the hole required.

In the accompanying drawings, I have illustrated presently preferred embodiments of my invention, in which.

Figure 7:
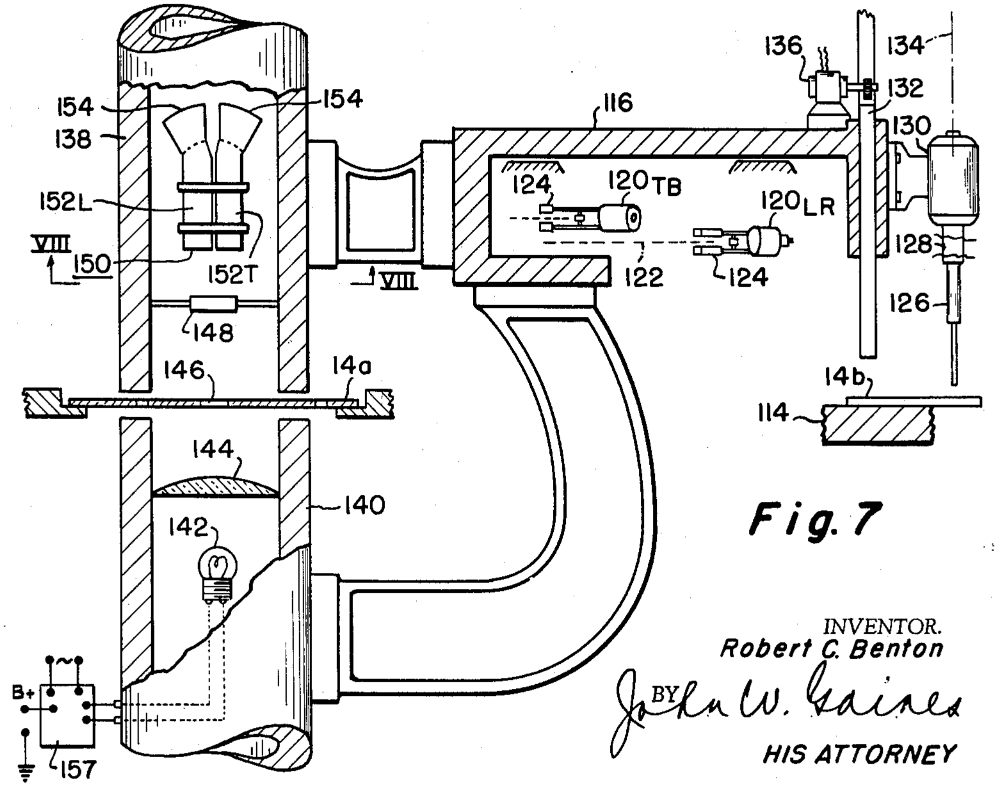
FIGURE 7 is a fragmentary view of the modification of the present invention having photocell follow-up mechanism.
Figure 9:
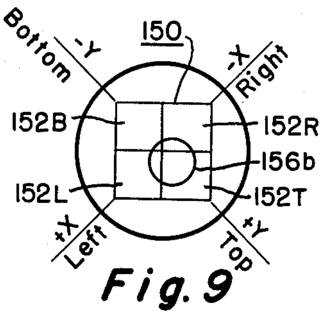
FIGURE 9 is a transverse section similar to FIGURE 8 with a slight variation in relative displacement.
Figure 11:
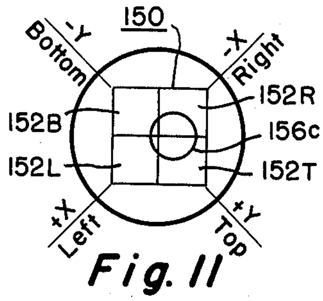
Figure 10:
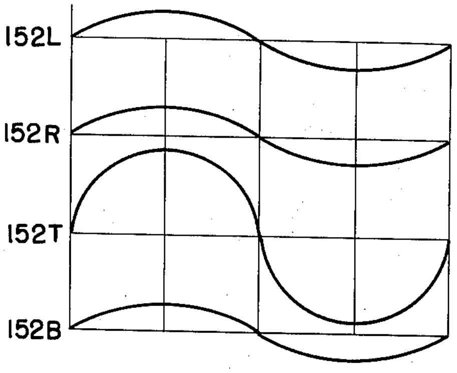
FIGURE 10 is a graph showing the photocell output curves appropriate to FIGURE 9.
Figure 12:
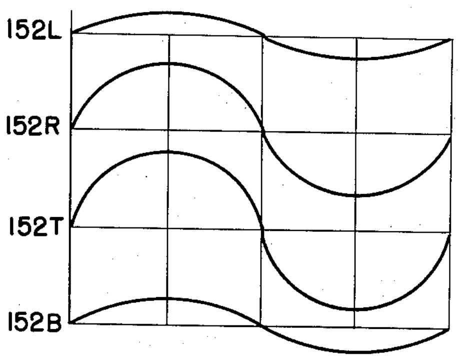
Figure 13:
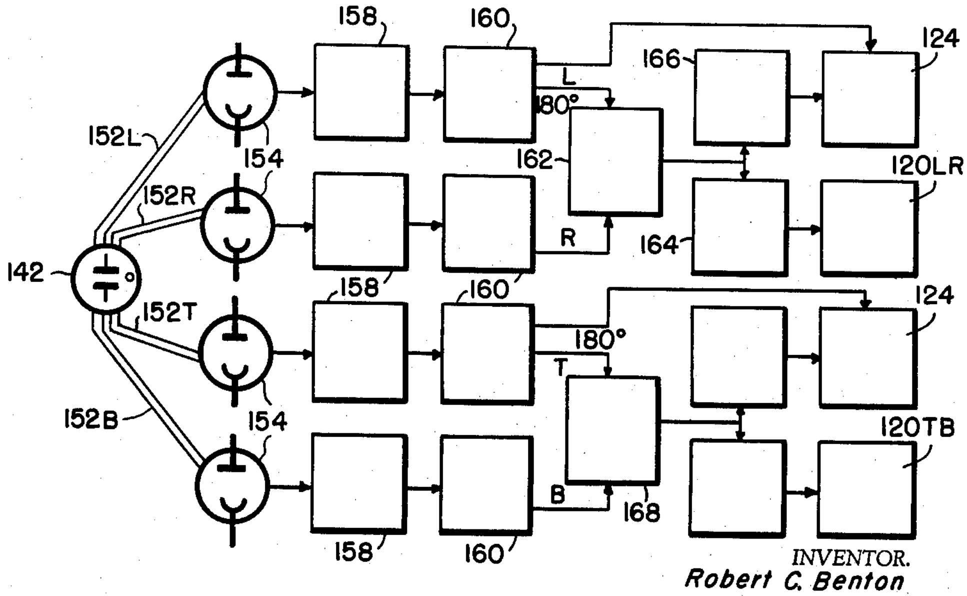
Figure 14:
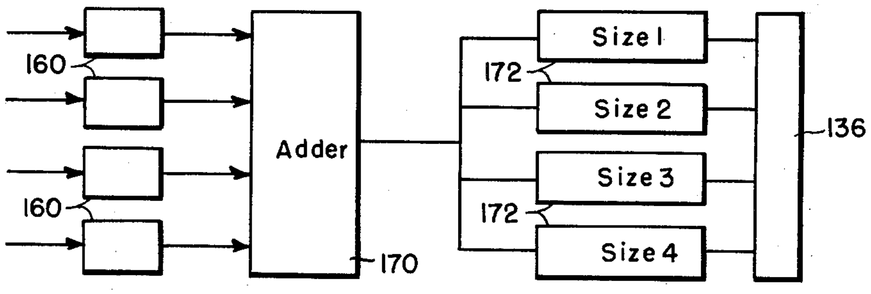
Figure 15:
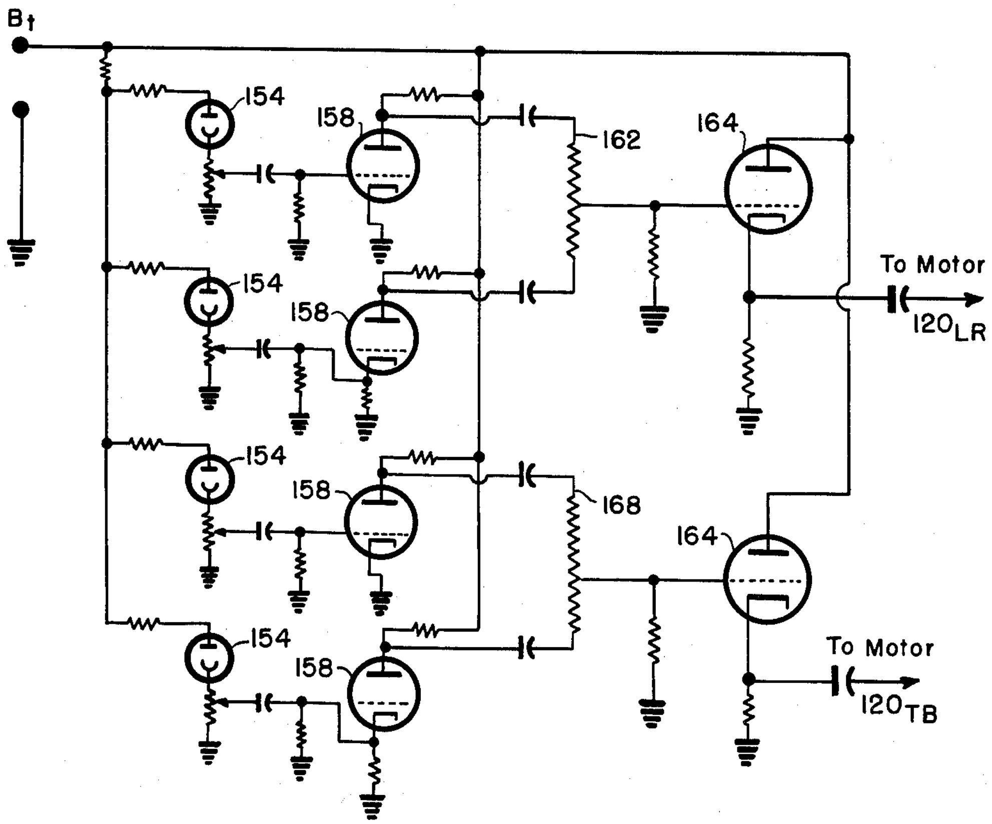

FIGURES 11 and 12 correspond to FIGURES 9 and 10 except for a further relative displacement;

FIGURE 13 is a block diagram of the main control system for the photocell follow-up mechanism of FIGURE 7;

FIGURE 14 is a block diagram of a further portion of the main control system; and FIGURE 15 is a schematic diagram of a portion of the block system of FIGURE 13.

Figure 1:
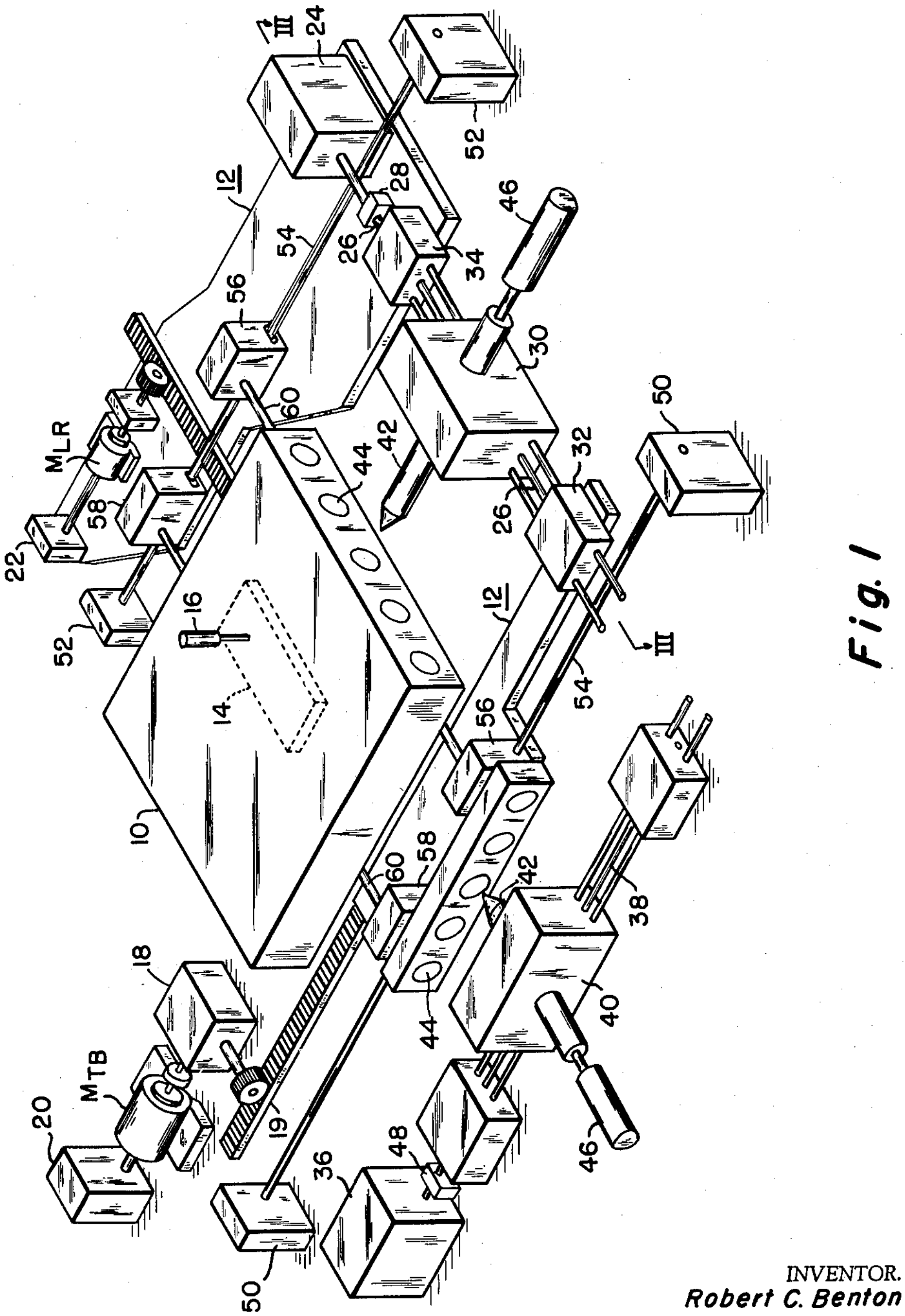
FIGURE 1 is a perspective view of my table indexing mechanism.

In FIGURE 1, I provide mechanism for indexing a work table 10 which is mounted for universal rectilinear movement in the plane of the table by means of a support 12. A workpiece 14 carried by the work table consists of a printed circuit board or blank adapted to be drilled by a drill press 16, operating along a fixed vertical axis. A forward-reverse clutch and motor assembly $M_{TB}$ is shaft connected through a gear reducer 18 and a rack and pinion 19 for moving the support 12 and the work table 10 in the top and bottom direction. An analog-to-digital converter 20 is connected to the motor shaft to sense the top and bottom position of the table for purposes of a digital feed-back control system hereinafter described. Another forward-reverse clutch and motor assembly $M_{LR}$ which is equipped with a similar gear reducer, rack and pinion, and an analog-to-digital converter 22 is operatively mounted on the support 12 to move the table 10 in the left and right direction.

A unit 24, consisting of a forward-reverse clutch and motor and a rotary analog-to-digital converter, is mounted to the support 12 to rotate a ball lead screw 26 which is controlled by a locking clamp 28 and which drives an indexing head 30. The head 30 is mounted on rods that are supported to ride upon a pair of opposite guide blocks 32 and 34, each being affixed to the support 12. A similar screw-drive unit 36 rotates a lead screw 38 and drives an indexing head 40 along a control axis relative to the work table 10, said heads 30 and 40 acting to lock the table in its proper top and bottom position and left and right position.

For this purpose, each indexing head carries a cone-shaped plunger 42 which is adapted to be received in one of a plurality of complementary cone-shaped sockets 44 carried on or adjacent the work table along two adjacent edges. The travel of each indexing head 30 and 40, owing to the predetermined spacing of its supporting guide blocks, is slightly greater than the distance center to center between adjacent sockets 44.

In operation of the apparatus of FIGURE 1, the motors $M_{TB}$ and $M_{LR}$ are automatically operated to cause the table 10 to carry the workpiece 14 to a position approximately under the drill 16. Simultaneously therewith, the units 24 and 36 move the indexing heads 30 and 40 through small increment positioning to a point substantially in alignment with the nearest socket 44 carried by the table. Thereupon, a plunger and cylinder actuator 46 provided on each indexing head functions through an effective longitudinally acting pressure area therein (not shown) to move the plungers 42 into seated positions within the sockets, thereby exerting a cross wedging action forcing the work table 10 into an accurately indexed position. The reaction in the indexing heads 30 and 40 is taken up by means of locking clamp 28 and a similar clamp 48 provided on the respective ball lead screws.

Figures 2, 3A:
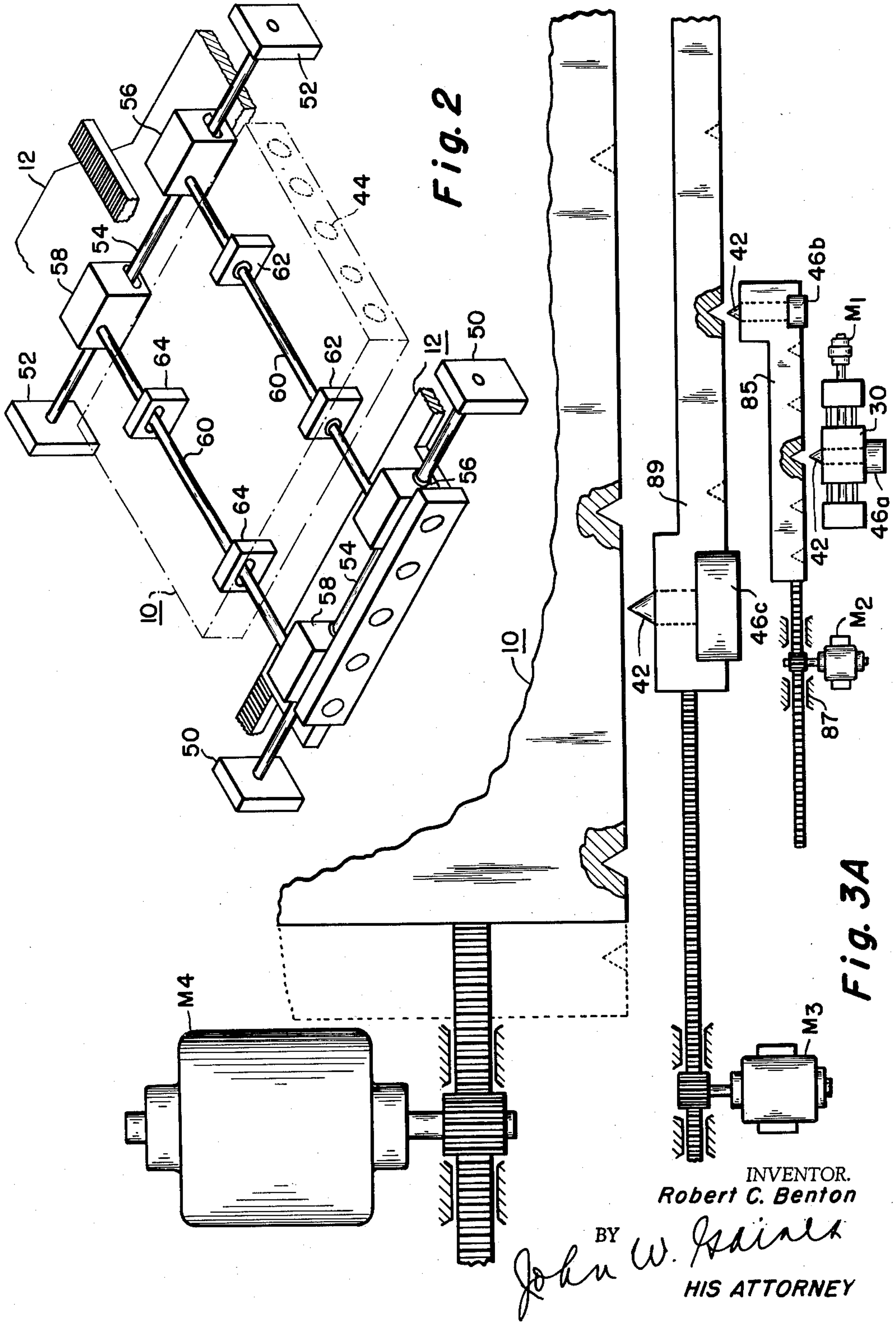
FIGURE 2 is a perspective view with portions of FIGURE 1 removed so as to clarify the table support.
FIGURE 3A is a view similar to FIGURE 3 showing a modification.

In FIGURE 2, pairs of fixed blocks 50 and 52 are set generally at the four corners of the support 12 and the movable work table 10 thereupon. These pairs of blocks carry rod-shaped ways 54 which are precision ground and hardened and of which the way 54 carried by the pair of blocks 50 constitutes a reference way. Pairs of blocks 56 and 58 to which the support 12 is fixed carry linear ball bushings (not shown) for rolling along the ways 54 and support another pair of ways 60 of which the way carried by the blocks 56 constitutes a reference way. Pairs of spaced apart table connected blocks 62 and 64 carry linear ball bushings (not shown) for rolling along the ways 60 and they directly support the table 10. It is essential only that the reference ways 54 and 60 carried by the respective blocks 50 and 56 have linear ball roller bushings associated therewith; and as actually illustrated in FIGURE 2, their companion ways fit within slots in the blocks associated therewith and supported thereupon, thus allowing for expansion and contraction in the structure.

It is evident that with the arrangement of the support 12 in FIGURE 2, the work table 10 is provided with universal movement in both of the rectilinear coordinate directions in its own plane enabling the workpiece thereon to be precisely positioned thereby as required.

Figures 3, 4:
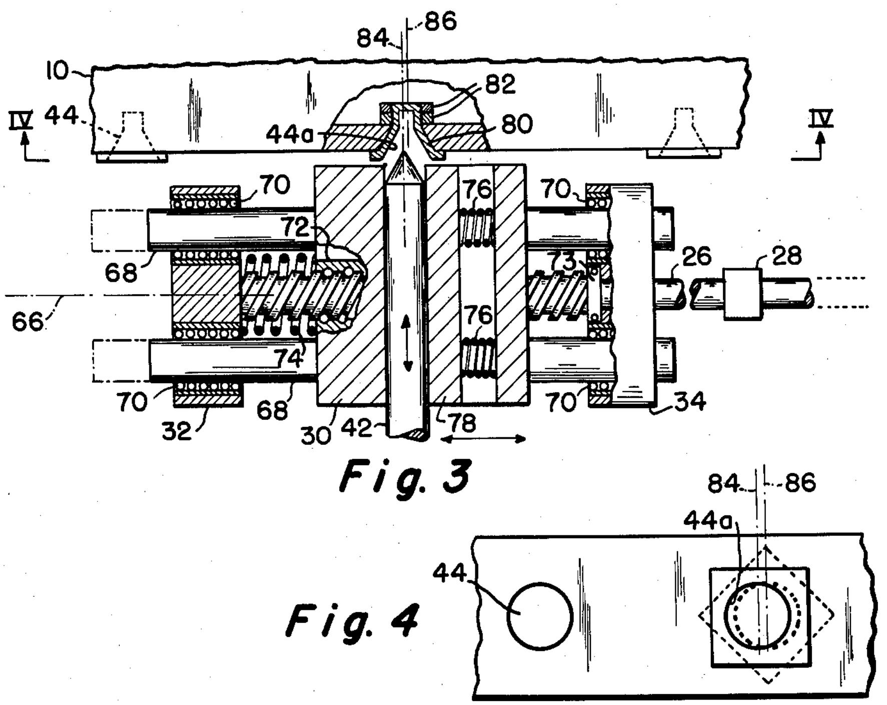
FIGURE 3 is a section in plan taken along the section lines III—III of FIGURE 1.
FIGURE 4 is a face view taken along the lines IV—IV in FIGURE 3.

In FIGURES 3 and 4, it is noted that the indexing head 30 travels along a control axis 66 closely adjacent one of the edges of the work table 10 carrying the sockets 44. The indexing head 30 carries fixed precision ground rods 68 which, at their opposite ends, are supported to ride in linear ball bushings 70 carried by the respective guide blocks 32 and 34. The indexing head 30 further carries two ball nuts, one of which is shown at 72, which are arranged back to back therewithin in surrounding relation to the ball nut lead screw 26. The ball nut lead screw passes from the clamp 28 through registering openings in the respective guide blocks 34 and 32 wherein it is set in bearings for rotation along the fixed axis 66. A pair of collars, one of which is indicated at 73, is secured to the lead screw 26 in spaced points to prevent it from moving axially with respect to the guide blocks 32 and 34.

One spring 74 which thrusts at one end against the guide block 32 and at the other end against the indexing head 30 surrounds the lead screw 26 to eliminate slack in the system; a pair of compression springs 76 thrusts against a movable jaw 78 in the indexing head 30 so as to clamp the plunger 42 carried thereby against movement out of a vertical plane although the plunger 42 has slight freedom of movement in the vertical direction for the reason explained immediately hereinafter.

In order to provide for precision center-to-center alignment between adjacent sockets 44, an insert element 80 is provided at fixed intervals and seated within a machined socket in the edge of the table 10. The insert 80 is hardened and held by a pair of lock nuts 82 which are relatively rotatable to lock the insert in any angular rotation desired within its receiving socket. A bevel or cone-shaped socket 44a within the insert corresponds to the sockets 44 in alignment therewith but has an eccentric axis 84 relative to the main axis 86 for the insert 80. An adjustment is thus provided so as to bring the socket axis to an exact center-to-center distance with reference to the adjacent socket 44. Inasmuch as the beveled or cone-shaped plunger 42 is capable of limited movement in the vertical direction as above indicated, the slight misalignment necessitated in the center line of the socket 44a in the vertical direction is readily accommodated.

In the modification of FIGURE 3A, a small increment positioning head 30 and an excessively large increment positioning table or table-connected member, both indicated at 10, correspond in general to the like devices of FIGURE 3 just discussed. However, when the cylinder 46a of the head 30 is operated, the advancing plunger 42 engages an appropriate adjacent socket in one of two intermediate increment positioning heads 85 and 89. The head 85 is positioned by means of an automatically controlled intermediate increment positioning motor $M_2$ which has a rack and pinion connection to the former and which is locked at an appropriate time automatically by means of a set of clamps 87. The head 85 carries a cylinder 46b which operates the associated plunger 42 into a socket on the second intermediate increment positioning head 89. The head 89 is similarly controlled through a rack and pinion by means of a somewhat larger motor $M_3$ under control of a set of clamps engageable with the rack thereof. A cylinder 46c on the head 89 operates to drive an associated plunger 42 into a socket carried by the table or table-connected member 10.

The table-connected member 10 is subject to exceedingly large increment positioning by means of a motor $M_4$, such as suitable in the example of a boring mill in which the bed runs up to 100 feet or longer. Similarly, a rack and pinion drive and a set of clamps operate to hold the table-connected member stationary prior to boring.

In the operation, the motors $M_1$, $M_2$, $M_3$, and $M_4$ of FIGURE 3A are simultaneously energized bringing the respective elements positioned thereby into a rough alignment whereby each plunger 42 substantially confronts a socket on the next adjacent head element. The cylinder 46a is then operated whereupon the plunger 42 wedges the intermediate head 85 into exact alignment with the reference head 30. Thereupon, the clamps 87 are operated to lock the head 85. The cylinder 46b is then automatically operated whereupon the associated plunger 42 brings the second intermediate head 89 into a position exactly referenced to the small increment positioning head 30 and thereupon the clamps lock the head 89. At that point, the heavy cylinder 46c drives the associated plunger 42 into the confronting socket on the table-connected member 10 so that when the latter is perfectly referenced with respect to the head 30, the clamps effective on the table-connected member 10 lock it solidly for a subsequent boring operation.

In this way, the small increment, the two intermediate increment and the exceedingly large increment positioning motors are operated simultaneously to effect a time saving; and when this adjustment period is terminated, the motors are stopped and the cylinders 46a, 46b and 46c are rapidly operated in succession to complete the highly accurate positioning.

Data input control for the apparatus of FIGURE 1 can be provided from conventional punched cards, magnetic tape, or with a practical view to the economics of the operations intended, by punched paper tape which is preferred for that reason. Desirably, an eight-binary-digit input is introduced into each of the two coarse settings for the table 10 for control of both its left-to-right and its top-to-bottom positioning. A second set of eight binary digits to each of the fine or small increment settings is contemplated for the indexing heads 30 and 40. In considering the specific dimensions of the work table in analogous terms to the digital control just referred to, it will be seen that highly accurate settings can be accomplished, preferably with a minimum positioning accuracy of plus or minus 0.002" over a 15" by 15" area.

Figure 5:
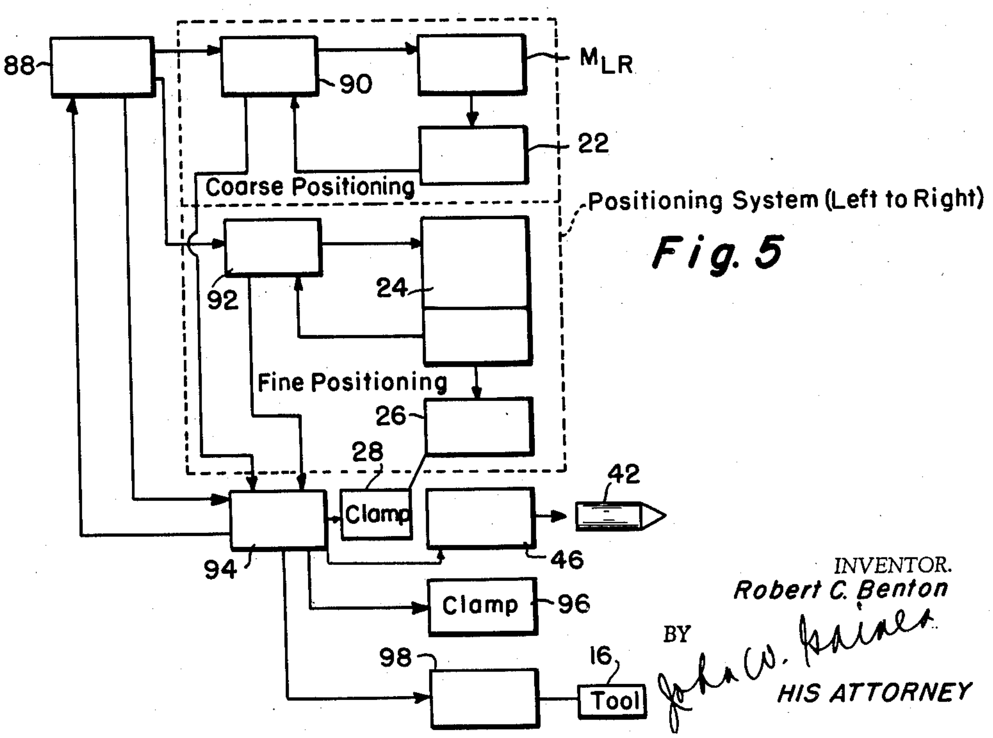
FIGURE 5 is a block diagram of a control system for the mechanism of FIGURE 1.

A portion of a control system for operating the left-to-right positioning is shown in FIGURE 5. The analog-to-digital converters 22 and 24 for the respective table and for the indexing head 30 are adapted in conjunction with a tape reader 88 to introduce feedback data and original data into a table controller 90 and into a pin controller 92 indicated by block diagram. The table controller 90 controls the left and right positioning motor $M_{LR}$ for the table and the progressive positions taken by that table are mechanically introduced into the analog-to-digital converter 22 which thus in the role as a table position reader continuously supplies digitally encoded feedback readings. In like manner, the indexing head controller 92 operates the unit 24 which houses the forward reverse clutch and motor assembly and the rotary analog-to-digital converter connected to the ball lead screw 26. The feedback and original information being supplied by the respective converters and the tape reader 88 are correlated in a manner hereinafter described.

A sequential programmer 94 receives information supplied from the table controller 90 and from the plunger controller 92; and when it detects that those controllers have reached their satisfied positions, the sequential programmer initiates a series of sequential steps. First, it sets the lead screw clamp 28 on the lead screw 26 to prevent the indexing head 30 from moving; second, it actuates the plunger cylinder 46 to operate the plunger 42 into its reception socket 44; third, it operates a table clamp 96 to prevent the table from moving during a drilling operation, and thence it operates a tool selector and actuator 98 which controls the drill 16.

It will be apparent in the operation of the control system of FIGURE 5 that the clutches both in the forward-reverse clutch and motor assembly $M_{LR}$ and in the combined unit 24 are disengaged prior to the actuation of the plunger 42. After the drilling operation is completed and the drill is withdrawn by the programmer 94, the programmer thereafter actuates the tape reader 88 to advance to another data block, the plunger 42 is caused to be withdrawn by the cylinder 46, and the clutches just referred to are re-engaged immediately upon start of the next point-to-point positioning operation.

A similar positioning system for controlling the table 10 in its top-to-bottom operation will be employed under control of the tape reader 88 and corresponding feedback data handling and the operation will be similar to the one just described. These operations, of course, transpire simultaneously giving the table a dual positioning action with a consequent time-saving being afforded.

Figure 6:
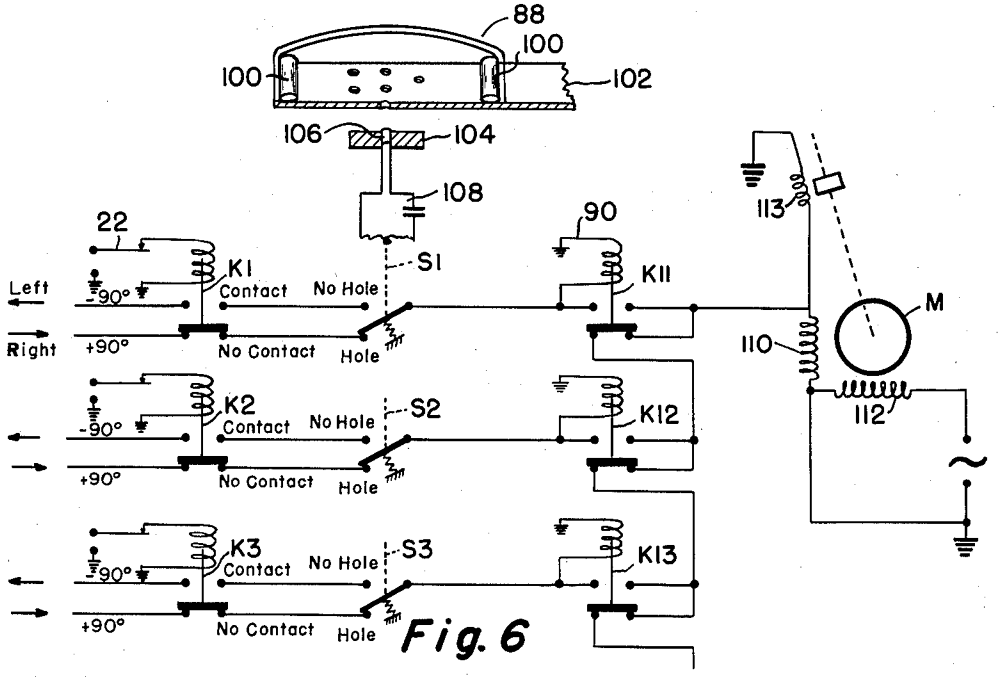
FIGURE 6 is a schematic diagram of a portion of the controls of the block diagram of FIGURE 5.

A portion of the control system of FIGURE 5 is schematically indicated in FIGURE 6, the purpose being to control a motor M corresponding to the motor in either of the head positioning units 24 and 36 or the top-to-bottom positioning motor $M_{TB}$ or the left-to-right positioning motor $M_{LR}$. Let it be assumed that the motor M is employed to perform the function of the preceding motor $M_{LR}$.

The tape reader 88 has a pressurized chamber containing tape drive rollers 100 which repetitively advance punched paper tape 102 along a surface 104 across which it slides. The tape has a plurality of openings punched for binary coding, each of which registers with a separate opening 106 formed in the surface 104. The respective openings 106 control a series of switches S1, S2, S3 and so forth, each operated by an individual pressure capsule 108. Whenever a hole in the tape 102 registers with an opening 106, pressure from the pressurized reader 88 passes into the capsule 108 to direct the corresponding switch to its downward position as shown in solid lines in FIGURE 6; otherwise, a spring returns the switch to its corresponding upper no-hole position.

A contact in the rotary-to-digital converter 22 operates an electromagnetic relay K1 so as to move it from its lower position shown in solid lines to an upper energized position, and this contact in the converter is closed or not dependent upon whether the work table returns feedback settings indicating a satisfied or an unsatisfied position to the table controller 90. The converter 22 in this fashion controls whether a 90° leading or a 90° lagging voltage is available to be supplied to the relay K11 in the table controller 90. Similar contacts in the converter 22 control other electromagnetic relays K2, K3, and so forth, each one supplying a different channel of information which must be brought into coincidence with the binary channels of input data information from the tape reader 88. Until these channels are brought into coincidence, the respective electromagnetic relays K11, K12 and K13 within the table controller 90 are held in their unsatisfied upper position owing to the fact that these relays remain energized.

The electromagnetic relays K11, K12 and K13 are connected to a control winding 110 which is physically set at 90° angularity to a power phase or reference winding 112 in the forward-reverse clutch and motor M. In well-known manner and depending upon whether a 90° leading voltage or a 90° lagging voltage is fed to the control winding 110, the resulting rotating field in the motor M causes it to be rotated in one direction or in the opposite direction tending to move the table appropriately leftwardly or rightwardly so as to cause the feedback data from the converter 22 to coincide with the input data from the tape reader 88. A clutch solenoid 113 in the clutch and motor M operates to declutch the latter automatically when it quits rotating, but simultaneously re-engages the clutch when the motor restarts.

The relays K11, K12 and K13 which serve the various channels of binary coded information corresponding to the desired numerical table position operate in a sequential manner to make the major table corrections first and to eliminate delay by ignoring any channel of information which is already satisfied. That is to say, if the relay K11 is energized with either a 90° lagging or leading voltage so as to assume its upward position, this voltage is continuously impressed upon the control winding 110 until the feedback information from that channel of the converter 22 becomes satisfied. At that point, the electromagnetic relay K1 operates in a proper direction to deenergize the electromagnetic relay K11 and thereby the motor M comes under the direct voltage of the relays K12 and K13. If the relay K12, for instance, is already deenergized owing to the feedback relay K2 therefor being satisfied, there is no attendant delay for considering this channel of information and the control of relay K13 over the control winding 110 is automatically effective.

The tape 102 of FIGURE 6 similarly controls the other three motors through appropriate mechanism, not shown, and in this fashion, the work table 10 is expeditiously advanced in its point-to-point positioning as dictated by the punched tape 102. Eight sets of eight digit binary codes are necessary for this operation, two sets being necessary for the coarse and fine adjustment of each of the motors $M_{TB}$, $M_{LR}$, unit 24 and unit 26. As above indicated, these tapes are pre-punched with the punching data being determined from scale drawings or from scale measurements on a direct master board which is to be duplicated on the board blanks.

Figure 8:
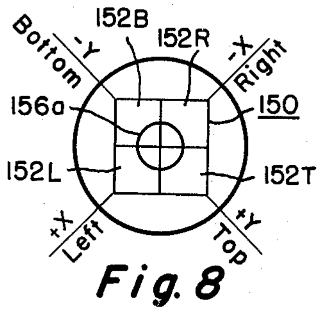
FIGURE 8 is a transverse sectional view taken along the lines VIII—VIII of FIGURE 7.

A modification of the invention is shown in FIGURES 7 and 8 whereby the final positioning can be accomplished directly from a master board or template which is pre-drilled. The master board is indicated at 14_a_ having a fixed support and a board blank to be drilled to conform to the master is indicated at 14_b_ having a fixed support table 114. A drill table 116 is supported for universal movement in the two rectilinear directions in its own plane and is operated by a motor $120_{TB}$ and by a second motor $120_{LR}$. Each of these motors operates a suitable rack and pinion or a lead screw 122 which has a pair of automatically operated clamps 124 associated therewith. One or a series of stepped drills 126, 128 and 130 has mounting means 132 by which they are movable on their individual vertical axes 134. A drill feed mechanism is schematically indicated at 136 for extensibly and retractively controlling the individual motor mounting means 132. The depth of feed of each drill determines the final size of the opening formed in the board blank **14*b***.

The work table 116 has brackets by which it rigidly carries a sensing head 138 and shield 140, the head and the shield being vertically spaced apart so as to universally move in opposite confronting planes to the plane of the master board **14*a*. The light shield 140 carries a neon bulb 142 which through a collimating lens 144 directs collimated light through confronting holes 146 occurring in the master 14*a*. The collimated light thus passes as a beam through a registering dual-function lens 148. It enlarges the beam and at the same time focuses same in the direction of a bundle of four light guide elements 152B, 152R, 152T, and 152L** which are of elongated shape with square cross section and made of clear plastic such as Plexiglas but preferably Lucite rods.

The plurality of adjacent end surfaces of the Lucite rods collectively presents one common square area 150 establishing four quadrants to receive the focused light which is conducted therefrom in the body of the plastic material and is thus made available for distribution to photocells. Individual to each of the opposite ends of these lucite rods, which may diverge in order to provide more clearance space, there is provided a set of four complementary photocells 154, each being sensitive to the portion of the light distributed by the corresponding Lucite rods. When the spot of light emitted from the hole 146 appears at the position 156A which by visual inspection can be seen by the crossed lines to be accurately centered in the area 150 shown in FIGURE 8, all four photocells are equally excited and their output is equal.

Preferably, pulsating light is emitted through the hole 146 by the neon bulb 142, this bulb being supplied by a source 157 with steady direct current which is under sufficient voltage (70–110 v. D.C.) to keep the bulb illuminated at all times and over which there is superimposed a 30-cycle A.C. or 60-cycle equivalent pulsating D.C. ripple voltage. The ripple voltage is the component relied on in the photocells 154 and the steady light on which the ripple voltage is superimposed is for the purpose of reducing the side effects of room light or other ambient light from external sources of illumination that leaks past the light shield 140.

For this reason, the output of the four photocells 154 when they are in exact balance consists of coordinated, similar sine waves.

FIGURES 9 and 10 illustrate the influence of the light spot when it takes a displaced position 156B relative to the light-receiving surface 150. The complementary pair of Lucite rods 152B and 152T define a diagonal reference axis +Y and −Y for measuring displacement of the light spot 156 B in the top-to-bottom direction; a shift toward the top quadrant for example (in the +Y direction) excites the top quadrant one of these companion photocells with more light than the other. On the other hand, the common diagonal reference axis of the rods 152R and 152L has the spot 156B relatively centered with respect to +X and −X measurements thereof and the photocells sense no unbalance along that coordinate axis. The light traveling in the Lucite rods introduces a photocell output in accordance with FIGURE 10 from which it can be seen that the photocell receiving light from the rod 152T will be excited considerably more than any of the other photocells.

FIGURES 11 and 12 correspond to FIGURES 9 and 10 except for the fact that the light spot on the surface 150 has transferred to a position 156C in which it is off center with respect to both +X, −X, and +Y, −Y axes. In that event, the output of the photocells supplied by the respective Lucite rods 152L and 152B is seen to be diminished according to FIGURE 12, whereas the output due to light traveling through the rods 152R and 152T has a substantial magnitude. These outputs are available to operate a control system causing the sensing head 138 of FIGURE 7 to take an exactly centered final position with respect to each drill hole in the master **14*a*. While the drills 126, 128 and 130** may be expeditiously advanced from point to point and coarsely pre-set by hand relative to the blank *14b* to be drilled, preferably a data information system similar to the foregoing embodiment will be employed to bring the sensing head 138 into the immediate vicinity of each hole 146; in either case, it is thereafter followed up and precisely centered upon automatically.

A follow-up control system for performing the centering operation just described in response to the photocell signals is shown in block diagram form in FIGURE 13. The respective Lucite rods 152L, 152T, 152B, and 152R communicate the pulsating light from the neon bulb 142 to the photocells 154 which, in response to the A.C. ripple voltage component thereof, introduce an A.C. signal into individual amplifiers 158. The amplified output from each photocell is compared to that of its complementary photocell by first passing it through a phase splitter 160 making available both in-phase and out-of-phase signals. An in-phase signal from the right or −X axial direction is introduced into one side of a comparison adder 162 and an out-of-phase signal from the left or +X direction is introduced into the opposite side of that adder so that as combined, they cancel one another if of equal and opposite magnitudes. If they are of unequal magnitudes, e.g., indicative of a displacement in the −X direction in accordance with FIGURE 11 hereinabove; a comparative error voltage is introduced by the adder into a normally balanced servo-amplifier 164 which is immediately unbalanced to operate the motor $\mathbf{120}_{LR}$ of FIGURE 7. This motor thereupon moves the drill table 116 and the sensing head 138 to a position in which the light spot reaches the satisfied position 156A of FIGURE 8, i.e., the sensing head operates with a follow-up servo-mechanism action to make the area 150 follow to the point to which the data input has caused the light spot to be displaced among the coordinates in that area. At this point, a satisfied-position detector 166 actuates the table lock clamp 124 of FIGURE 7 and locks the table for a drilling operation.

In a similar manner and with like amplifiers and phase splitters, a top-to-bottom adder 168 is provided to control the motor $\mathbf{120}_{TB}$ through a balanced amplifier and is either interlocked with the clamp 124 above or another clamp 124 is provided to lock the table along the +Y and −Y axis. This adjustment prior to locking takes place simultaneously with the +X, −X adjustment; and at the proper time, the right drill is operated and to the right depth.

FIGURE 14 is a block diagram showing how the selection of the drill and its penetration to the proper depth is accomplished. An in-phase signal from each of the phase splitters 160 is fed into a common adder 170 for combining them; in this fashion, the sum voltage output of the four photocells is made available. Inasmuch as the light spot is approximately centered at this point, the output of each photocell is approximately one-fourth of the sum. This sum voltage is compared to a group of known reference voltage values within a series of graduated comparators 172 for determining the proper drill hole size signal which is communicated by the comparators to the drill feed control mechanism 136. As above indicated, the depth of feed of each stepped drill controls the resulting hole size by predetermining the depth of penetration to be reached in the blank **14*b***.

Illustrative of one example of photocell error comparator is the schematic electronic circuit of FIGURE 15 for controlling the fine adjustment of the respective motors $\mathbf{120}_{LR}$ and $\mathbf{120}_{TB}$ of FIGURES 7 and 13 preceding. The sine wave output from each of the four photocells 154 is individually capacitance coupled to vacuum tube amplifiers 158 corresponding to the schematic blocks 158 of FIGURE 13 preceding. A left-to-right adder 162 of the resistive type which corresponds to the block 162 of FIGURE 13 is capacitance coupled at each end to a different one of the amplifiers 158, and the output therefrom is applied to the grid of a servo-amplifier tube 164. The amplifier tube 164 is capacitance coupled to the motor $120_{LR}$ which may be of the two-phase servo type similar to the motor M of FIGURE 6 in the preceding embodiment. That is to say, the motor $120_{LR}$ (not shown) has a power phase or reference winding which is physically set at 90° to a field control winding under control of the servo-amplifier 164.

With reference to the power phase winding, the so-called in-phase and out-of-phase outputs from the servo-amplifier are impressed as relatively 90° leading and 90° lagging voltages on said control winding. The resulting rotating field, depending on the dominance of the leading or lagging voltage for its direction of rotation, causes the motor $120_{LR}$ (not shown) to rotate in the proper direction to satisfy the error voltage of a complementary pair of the four photocells 154.

Another resistive adder 168 in FIGURE 15 similarly supplies in-phase and out-of-phase voltage signals to another servo-amplifier 164 which controls the motor $120_{TB}$ (not shown). The motor $120_{TB}$ is a two-phase servo motor similar to the preceding motor $120_{LR}$ except that these motors are physically related along perpendicular coordinates to one another for moving the table respectively in the top-to-bottom and the left-to-right directions. For purposes of either direction, the electronic comparator recognizes which photocell or photocells have the larger output and directs the motors to move the sensing head in the proper direction to make the outputs of all cells equal.

In operation of the preceding embodiments of FIGURES 1 and 7, the relatively movable one of the tables is advanced point by point to bring the tool element and the blank element to be drilled into the proper relationship for drilling. After the required number of holes of proper point-to-point spacing and size are drilled, the board blank is removed by hand or by automatic ejectment machinery as appropriate; another undrilled blank is substituted and prior thereto or immediately following, the work table is restored to its starting position.

The operation is then repeated.

As herein disclosed, the drawing shows a clamp 28 and another clamp 96 in FIGURE 5 for clamping the respective indexing head 30 and the table 10 in proper position prior to drilling, the positioning motors being automatically declutched beforehand. A similar clamp 48 is provided in FIGURE 1 for clamping the opposite indexing head 40 prior to clamping the table. In the embodiment of FIGURE 7, a clamp 124 as above indicated, is employed to clamp the drill table 116 along the axis 122 and a similar clamp used on the shaft of the companion motor $120_{TB}$ is necessary for the reason that the servo system of FIGURE 7 is undamped; the two clamps just referred to are preferably automatically actuated 50 milliseconds after the error voltage has gone to zero provided, of course, the photocell outputs are maintained above a predetermined level at this point. That is to say, the error voltage is zero when no hole is registering with the sensing head inasmuch as the cell output is zero under such circumstances and it is, of course, essential that the clamps do not operate before a hole approaches the vicinity of the sensing head 138.

It is evident that the principles hereof are equally applicable to the relatively movable table in either system of the type generally as shown in FIGURES 1 and 7 herein, it being immaterial in principle whether a drill table or multiple spindle drill or a tool moves relative to a work table which is fixed, or vice versa.

While I have described certain present preferred embodiments of my invention, it is to be understood that it may be otherwise embodied within the scope of the appended claims.

I claim:

1. In a stepped power drill mechanism for drilling a workpiece in accordance with a master, said master provided with a plurality of holes at reference points thereon, the combination of power operated feed control means connected to operate the stepped power drill of said drill mechanism, means for directing light through said holes individually with the precise hole size in said master determinative of the total light passing therethrough, and photocell controlled power delivery means connected to said drill feed means for applying power to operate said stepped power drill to a controlled depth of feed in correspondence with the total light emission through each hole.

2. In a stepped, power drill mechanism for machining a workpiece to correspond to the hole-to-hole positioning, size, and spacing on a template, the combination of a sensing head for confronting said template at a selected reference point on the latter, light detecting means connected to said head, said template provided with a light-directing hole at said reference point and with the precise hole size determinative of the total beam of light directed therethrough to said light sensing means, and power delivery drill control mechanism including the light detecting means and responsive thereto for applying power to said stepped power drill mechanism to move the drill to a controlled depth of feed in correspondence with the total light through said hole.

3. In a stepped, power drill mechanism for drilling a workpiece in accordance with a template, said template provided with a plurality of light-directing holes at reference points thereon and with the precise hole size determinative of the total light passing therethrough, the combination of a sensing head with an area therein for receiving said light, defined by a plurality of light receiving surfaces and adapted to confront said template at successive reference points, photocells individual to said light receiving surfaces and providing a common electrical output, and photocell-controlled power delivery means connected to said photocells and to said power drill mechanism for applying electric power to move said stepped power drill to a controlled depth of feed in correspondence with the magnitude of the common electrical output from said photocells.

4. In a stepped, power drill mechanism for machining a workpiece to correspond to the hole-to-hole positioning, size, and spacing on a master template, the combination of drill feed control means connected to operate the stepped drill of said drill mechanism, and hole location responsive control mechanism connected to said feed control means for extensibly and retractively moving the stepped power drill to a controlled depth of feed in said workpiece.

5. In a stepped, power drill mechanism for machining a workpiece to correspond to the hole-to-hole positioning, size, and spacing on a master template, the combination of a sensing head, means mounting said head for universal movement in a plane of confrontation to said template and having positioning means automatically operative to substantially center said head of a selected reference point on one side of said template, an emitting source element on the opposite side of said template, an emission detecting element in said sensing head, there being a hole at said reference point on the template through which both elements can register and with the size thereof determinative of the total emission therethrough, and power delivery control mechanism including the emission detecting element for applying power to move said stepped power drill through controlled feed to a depth in correspondence with the total emission through said hole.

6. In indexing mechanism including a stepped, power drill for drilling a workpiece in accordance with the hole arrangement on a master template and further including positioning means for relatively moving a pair of respective drill and workpiece carrying tables for the above, said template provided with a light-beam-directing hole at a reference point thereon; the combination of a sensing head adapted to confront the reference point on said template and connected for universal movement coordinated with the movable one of said tables, said head including a light receiving area made of groups of complementary surfaces with photocell means individual thereto and providing sum and error voltage outputs developed in response to said light, said photocell means being arranged complementary to one another in groups whereby they have a light-satisfied position with the light divided thereamong and with their voltage error developed in correspondence with the deviation from said position, power delivery means to apply the error voltage output of said photocell means to the positioning means to automatically cause the relative movement aforesaid in a direction whereby said light beam and the photocell means with respect thereto reach the satisfied position aforesaid, and power delivery means to apply the sum voltage output of said photocell means to move said stepped power drill to a controlled depth of feed in correspondence with the total light from said beam.

7. In follow-up mechanism for indexing with a traveling spot of light, sensing head structure including spaced apart, complementary photocells occupying separate adjacent quadrants, elongated guide elements of light conducting material individual to the photocells and convergently arranged so as to be secured together at a common end, and means to focus the spot on said common end of the light guide elements as it traces thereacross.

8. In a method of indexing the center head element carried by a tool, with respect to the pattern of formed holes in a master workpiece element which are to be repetitively duplicated in a work blank by said tool, the improved steps of two-stage indexing procedure comprising relatively moving said elements through large increment positioning to an approximately indexed position wherein an adjacent hole in the master workpiece coarsely aligns with said head element, generating a beam of light having a steady component and superimposing on that steady component another component through the introduction of a ripple voltage, directing said beam of light through the adjacent hole in said master workpiece element so as to project a pulsating light spot at a point which is within and sensed by said head element, relatively moving said elements through small increment positioning thereof to a position in which the pulsating light spot and the head accurately center on one another, and repeating said two-stage relative movement following each tool operation on the work blank, whereby the pattern of said workpiece is located hole for hole in accordance with the holes on said master workpiece element thus directly duplicating the pattern of said master.

9. Centering means causing one device having universal freedom of movement along two coordinate axes to center itself in accordance with a position dictating point on a master workpiece, the plane of which workpiece is parallel to said two coordinate axes, which comprises a beam directing hole at said position dictating point, first and second reversible power means for applying power to move said one device along the two coordinate axes, balanced amplifier means for operating said reversible power means; means on said one device at one side of said workpiece plane for directing a beam of energy normal thereto, and through said beam directing hole, complementary photosensitive surfaces in said one device at the opposite side of said workpiece plane and responsive to the deviations of distribution of energy between said complementary surfaces both along one axis and along the coordinate axis for unbalancing said amplifier means, and means connecting said amplifier means to individual ones of said reversible power means for selectively operating same automatic to restore said balance along both axes.

10. Centering means causing one device having freedom of movement along a rectilinear axis to center itself in accordance with a position dictating point on a master workpiece, the plane of which workpiece being parallel to said axis, which comprises an energy beam directing hole at said position dictator point, reversible power means for applying power to move said one device along said axis, a balanced amplifier for operating said reversible power means and having an adder input, means on said one device at one side side of said workpiece plane for directing a beam of energy normal thereto, and through the beam directing hole, complementary photosensitive surfaces in said one device at the opposite side of said workpiece plane and responsive to the deviations of distribution of the hole directed beam between said complementary surfaces for applying unequal voltages to the adder and unbalancing said amplifier, and means connecting said amplifier to said reversible power means for selectively operating same automatically to restore said balance.

11. In a mechanism for machining a workpiece to correspond to the hole-to-hole positioning and spacing on a master template, the combination of a drill table, support means provided therefor adjacent said master template and mounting said workpiece for universal movement in the plane of the table, and table positioning means having input data responsive control mechanism and further having template hole responsive control mechanism presenting a sensing device confronting said template and connected for universal movement with said table, said sensing device comprising photocell means at one side of said template and light emitting means at the opposite side and cooperating so as to sense alignment of a hole in the template as to its exact degree of registration therewith, said first named control mechanism connected to said table positioning means operative to move the table causing said sensing device to take a position of at least coarse prealignment with a hole in said template, said template hole responsive control mechanism connected to said table positioning means operative to move said table into fine adjustment carrying said sensing device into a position sensing exact alignment with said hole in said template.

12. In a mechansm for treating a workpiece in accordance with a template, said template provided with a light-directing hole at a reference point thereon, the improvement comprising beam-location responsive control mechanism adapted to confront the beam of light directed from said reference point, positioning motor means operating in paths at right angles to each other and connected to relatively move said control mechanism and said template simultaneously along coordinate axes, a balanced amplifier for operating each of said positioning motor means, separate sensing means connected to said amplifiers responsive to deviations in the position of said beam-location responsive control mechanism along both axes with respect to said beam of light for unbalancing the amplifiers, and including four complementary light transmitting surfaces in quadrature and a like number of excited actuating means connected thereto comprising light sensitive surfaces having a satisfied position with the beam at the center of the quadrant and straddling said complementary surfaces, and means connecting said positioning motor means to the different ones of said amplifiers whereby the amplifiers selectively operate the positioning motor means to restore said balance by relative movement btween said control mechanism and template, automatically establishing said sensing means in the satisfied position along both axes aforesaid.

13. In a mechanism for treating a workpiece in accordance with a template, said template provided with a light-beam directing hole at a reference point thereon, the improvement comprising beam-location responsive control mechanism including a sensing head adapted to confront said reference point, said head comprising a plurality of pairs of photocells disposed in separate quadrants from one another and from the photocells of the other pair and means to focus the received light beam at a point in an area therein representing a satisfied position in which the output of the beam will be divided among the pairs of photocells, the output of one pair of photocells developing a voltage error in correspondence with the deviation from said satisfied position along one axis, and the output of the other pair developing a voltage error in correspondence with the deviation from said satisfied position along a different axis, and positioning means connected for causing relative movement of adjustment between said sensing head and said template, said beam-location responsive control mechanism applying the output of said pairs of photocells to the positioning means to automatically cause said relative movement in a direction simultaneously along both axes whereby said light beam and the photocells strike the satisfied position aforesaid.

14. In combination, a surface on which to catch a light spot as a beam traces thereacross, a group of photocells spaced axially from said surface and arranged in light-reception relation thereto whereby their output is dependent upon the light being caught concentrically by said surface to excite all of said photocells, means for deriving simultaneous reading from a plurality of said photocells and producing therefrom a single electrical quantity indicative of their combined output, and utilization means controlling the positioning motor of a machine tool and controlled by said simultaneous reading deriving means in accordance with the displacement of said beam from the concentric relationship described so as to operate said motor.

15. In combination, a surface on which to catch a light spot as a beam traces thereacross, four photocells in a group spaced axially from said surface and arranged in light-reception relation thereto in quadrature whereby their output is dependent upon the light being caught concentrically by said surface to equally excite all of said photocells, means for deriving simultaneous reading from a plurality of said photocells and producing therefrom a single electrical quantity indicative of their combined output, said combined output representing the sum output voltage from said photocells, and utilization means controlled by said simultaneous reading deriving means in dependence upon the light being caught concentrically as described, said utilization means comprising a stepped drill and means for extensively and retractably moving said drill to a magnitude of depth penetration dependent on the magnitude of said sum voltage output.

16. In combination, a surface on which to catch a light spot as a beam traces thereacross, four photocells in a group spaced axially from said surface and arranged in light-reception relation thereto in quadrature whereby their output is dependent upon the light being caught concentrically by said surface to equally excite all of said photocells, first means for deriving simultaneous reading from two of said photocells and producing therefrom a single electrical quantity indicative of their combined output, second means for deriving simultaneous reading from the other two of said photocells and producing therefrom a single electrical quantity indicative of their combined output, and utilization means controlled by said simultaneous reading deriving means in accordance with the displacement of said beam along coordinate axes from the concentric relationship described, said utilization means comprising operating means to relatively move said surface along one axis with respect to said beam, a first balanced amplifier for operating same, operating means to relatively move said surface along the other coordinate axis with respect to said beam, and a second balanced amplifier for operating same, the combined output from said two photocells representing an error output voltage and the combined output from the other two photocells representing an error output voltage, said simultaneous reading deriving means applying each of said error voltages for unbalancing a different one of said first and second amplifiers to an extent corresponding to the displacement of the aforesaid beam along said axes from its concentric relationship.

References Cited in the file of this patent

UNITED STATES PATENTS

| | | |
|---|---|---|
| 2,479,293 | Bayless | Aug. 16, 1949 |
| 2,785,592 | Caples et al. | Mar. 19, 1957 |
| 2,832,239 | Bert et al. | Apr. 29, 1958 |
| 2,948,817 | Carpenter | Aug. 9, 1960 |